United States Patent
Moore

(10) Patent No.: US 6,760,827 B2
(45) Date of Patent: Jul. 6, 2004

(54) METHOD AND APPARATUS FOR ACCESSING ROM PCI MEMORY ABOVE 64 K

(75) Inventor: Derick G. Moore, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 110 days.

(21) Appl. No.: 09/997,776

(22) Filed: Nov. 30, 2001

(65) Prior Publication Data

US 2003/0105935 A1 Jun. 5, 2003

(51) Int. Cl.$^7$ .............................................. G06F 12/00
(52) U.S. Cl. ...................... 711/171; 711/172; 711/173; 711/2; 710/5; 710/6; 710/8; 710/104; 713/1; 713/2; 713/100
(58) Field of Search ............................ 710/5, 6, 8, 10, 710/14, 104; 711/2, 5, 102, 103, 104, 151, 153, 154, 156, 158, 161, 163, 165, 170, 171, 172, 173; 713/1, 2, 100

(56) References Cited

U.S. PATENT DOCUMENTS

| 5,671,413 | A | * | 9/1997 | Shipman et al. ................ 713/2 |
| 5,751,998 | A | * | 5/1998 | Wunderlich et al. ......... 711/163 |
| 6,282,647 | B1 | * | 8/2001 | Leung et al. ................ 713/100 |
| 6,446,139 | B1 | * | 9/2002 | Leung et al. ................... 710/1 |
| 6,505,263 | B1 | * | 1/2003 | Larson et al. ................ 710/100 |
| 6,505,278 | B1 | * | 1/2003 | Piwonka et al. ............. 711/162 |
| 2002/0169951 | A1 | * | 11/2002 | Zimmer ....................... 713/100 |
| 2003/0051114 | A1 | * | 3/2003 | Natu ........................... 711/165 |

* cited by examiner

*Primary Examiner*—Donald Sparks
*Assistant Examiner*—Christian P. Chace
(74) *Attorney, Agent, or Firm*—Suiter West PC LLO

(57) ABSTRACT

A method for augmenting the memory capabilities of an option ROM in which PCI function calls are used to access a larger sized non-volatile memory. Thirty two bit addressing is used in the PCI function call routines to allow for 4 GB addressing. An option ROM and the separate larger sized non-volatile memory or a single non-volatile memory may be used for storing the overflow images.

32 Claims, 4 Drawing Sheets

METHOD AND APPARATUS FOR ACCESSING ROM PCI MEMORY ABOVE 64 K

FIELD OF THE INVENTION

The present invention generally relates to the field of computers, and particularly to providing sufficient memory for option ROM expansion.

BACKGROUND OF THE INVENTION

The personal computer system is usually booted during a power up sequence using system software and information stored within a system read-only-memory (ROM). Since the system ROM is non-volatile, the ROM contains reliable data or instructions to boot up the system at least to a point where the disk operating system (DOS) can be loaded to complete the boot-up sequence. The Basic I/O System (BIOS) is a set of routines that works closely with the hardware to support the transfer of information between elements of the system, such as memory, disks, and the monitor. The system ROM stores the operating system program, such as BIOS, which is executed upon power-up by the microprocessor to initialize the system, as well as to perform a power-on self-test (POST) and to provide certain low level, hardware dependent support for the display, disk drives, and peripheral devices. More sophisticated routines and data may be included in the system ROM, depending upon the needs and complexity of a given computer system. BIOS code provides the lowest level of interface between the operating system and the hardware. On a system reset or power-on, the typical system retrieves the boot up instructions and data from the 1 megabyte or other size memory where they are stored. Further, a checksum routine is typically executed to verify the status of the BIOS currently available to the system. If the integrity of the BIOS is determined to be good, the boot code initializes the system and its peripherals and passes control to the operating system.

Peripheral Component Interconnect (PCI) is a high-performance, 32-bit or 64-bit bus designed to be used with devices that have high bandwidth requirements, such as display subsystems. Small Computer Standard Interface (SCSI) is an I/O bus designed as a method for connecting several classes of peripherals to a host system without requiring modifications to generic hardware and software. The Configuration Manager is a system component that drives the process of locating devices, setting up their nodes in the hardware tree, and running the resource allocation process. Each of the modes of configuration management (real mode, virtual mode, and protected mode) have their own configuration managers.

The option ROM is a real mode driver designed to manage the resources of some piece(s) of hardware. Its normal operating environment will not allow the code to exceed 64 K, nor will it permit access to code larger than 64 K even if it exists. The environment normally available to an option ROM in a personal computer (PC) is constricted by many legacy requirements. An example of those limits are the 1 megabyte X86 processor Real Mode memory limit, the space allocated for an option ROM runtime images which is usually 128K for all images. Other legacy devices lack universal memory manipulation routines for reserving and using memory and do not comply with the general requirement that unused memory be released as soon as possible.

Because of these restrictions, adding features and meeting industry standard requirements has become almost impossible. Option ROMs are limited to 64 K in size, the nominal maximum, and cannot grow and still operate in all but a few PCs.

There are various other problems involving the limited memory of option ROMs. The initialization time memory generally allocated for option ROM expansion is limited. The run time memory generally allocated for an option ROM is limited. The system expansion location for option ROMs is privileged information, not generally available to the option ROM. The initialization time memory allocation is not universally available on PC platforms. A nominal 64 K limit on option ROMs limits the addition of functionality and features. RAID recognition is a feature which requires access to normally unavailable memory. Simple Boot Support is a feature that requires access to normally unavailable memory.

Therefore, it would be desirable to provide an expanded memory capability for option ROMs.

SUMMARY OF THE INVENTION

Accordingly, the present invention is directed to a method and apparatus for expanding option ROM memory capabilities by using PCI function calls that allow function calls and 32 bit addressing of the FLASH option ROM and an associated FLASH memory.

In a first aspect of the present invention, a method for accessing, via the commands of an adapter, from a read/limited write memory having a first size, a memory area having a second size greater in size than the first size, includes the steps of preparing a load image for transfer to the read/limited write memory, making a determination of the size of the load image, initializing the read/limited write memory to enable addressing of the memory area, and making function calls to enable a configuration space for the adapter.

In a second aspect of the invention, a computer system is disclosed which has an adapter which provides control signals and data to other devices, a read/limited write memory having a first size and being coupled to the adapter to effect data transfers, and a main memory having a second size that is greater than the first size and being used to store an overflow image in a data transfer to the read/limited write memory when the load image to be transferred to the read/limited write memory has a size which exceeds the first size.

In a third aspect of the invention, a computer system which presumes a first size for a FLASH option ROM has an adapter having system BIOS and a non-volatile memory having a second size. The second size is greater than the first size. The system BIOS initiates loading into the non-volatile memory. PCI function calls are made to enable configuration space for the adapter in Big Real Mode.

In a fourth aspect of the invention, a method for using a non-volatile memory as an expanded option ROM includes the steps of using a system BIOS to enter Big Real Mode and making function calls to enable configuration space for an adapter on which the system BIOS resides.

In a fifth aspect of the invention, a method for switching operational modes for transferring data to and from an non-volatile memory the steps of a system BIOS being placed in a first operational mode and initiating process code, separate from the system BIOS and responsive to processing by the system BIOS, that ensures the system BIOS enters a second operational mode or prevents the system BIOS from leaving the second operational mode, in which the second operational mode supports a larger address space than the first operational mode.

The present invention combines various abilities such as placing the system in Big Real Mode if it is not already in that mode, locating the adapters PCI configuration registers, enable/re-enable the FLASH ROM memory on the adapter in a readable free memory space, validating the FLASH ROM memory, copying all or a portion of the FLASH ROM into main memory (below 1 MB), disabling/reverting the FLASH ROM memory to a known state, quitting Big Real Mode if it was started by the process of the present invention, and then using the code/data that was copied from the FLASH ROM to extend/enhance the capabilities of the normal load image and run time binary.

Using an undocumented series of X86 processor instructions that are supported across the X386 and beyond processors, including AMD and Transmeta, an environment is created for the initialization time option ROM that allows access to 4 Gigabytes of linear memory. Using that mechanism, and documented PCI entry points and function calls, the PCI configuration registers for the PCI adapter that the option ROM is booted from are located. The FLASH option ROM image is accessed in its raw form. By this method, the entire option ROM image is accessed, and not just the first 64 K or less that the PC system BIOS would ordinarily use.

The present invention gains access to the FLASH image of the option ROM.

The present invention provides a way to make use of more code and data in an option ROM.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
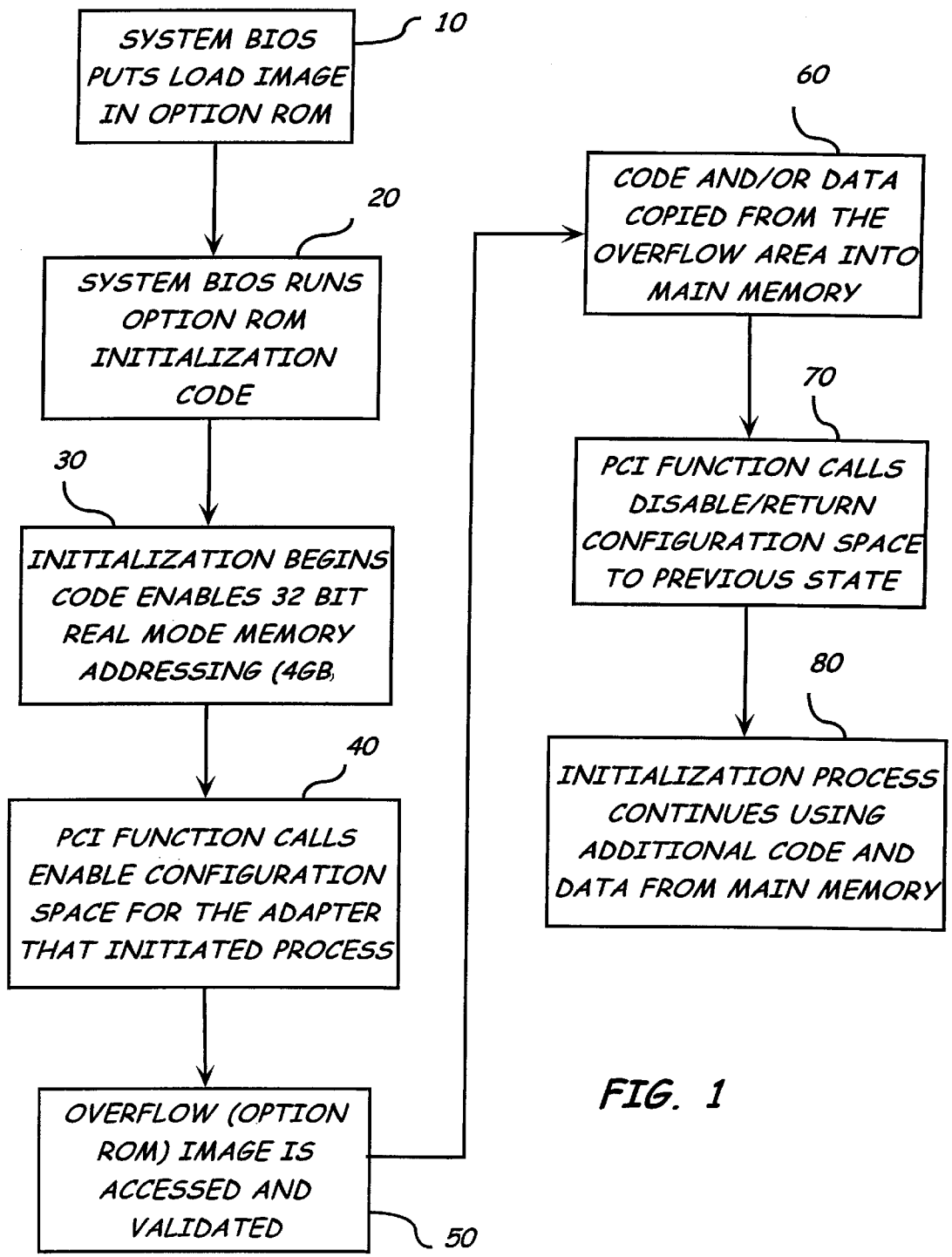
FIG. 1 illustrates a flow chart which lists the procedural steps in initializing an expanded option ROM memory using PCI function calls.
Figure 2:
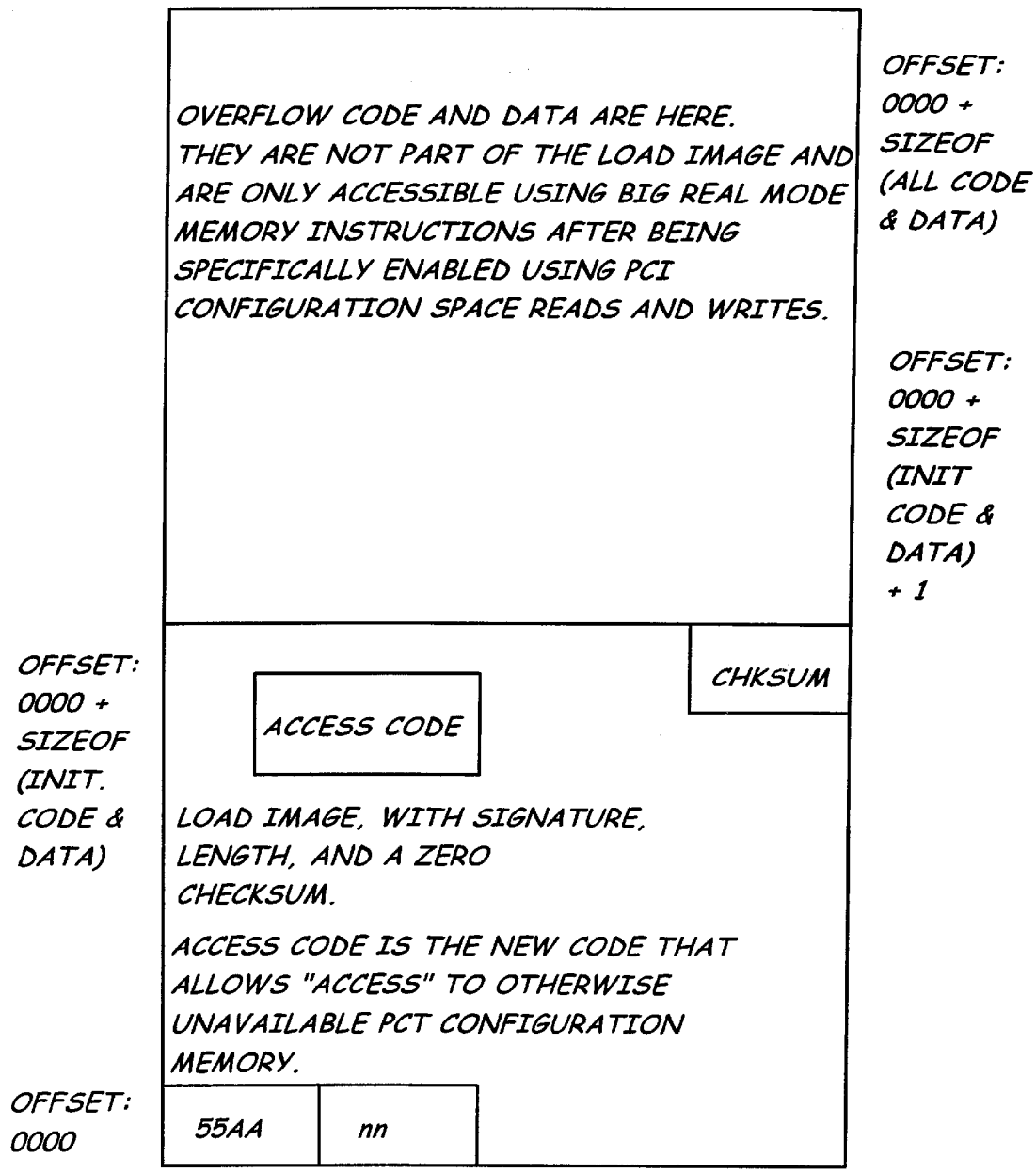
FIG. 2 illustrates a division of the FLASH memory associated with the option ROM capable of being addressed by 32 bits.
Figure 3:
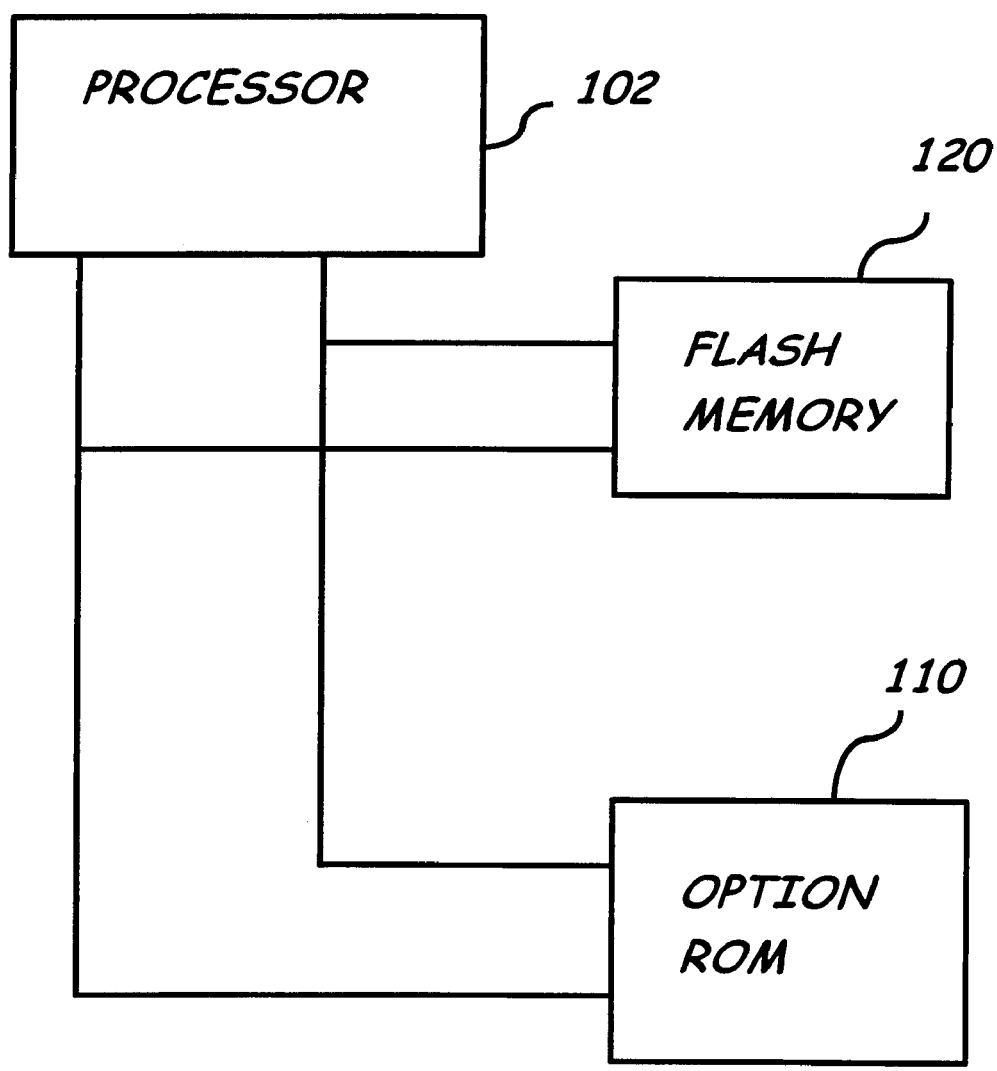
FIG. 3 illustrates a functional block diagram showing a processor, option ROM, and expanded memory associated with the option ROM.

Referring generally now to FIGS. 1 through 3, exemplary embodiments of the present invention are shown.

The invention makes use of some infrequently used capabilities that are supported by the X86 family of processors, in combination with functions of the PCI specification that are not usually associated with ROM initialization.

Real mode is a single-tasking execution mode supported by the Intel 80286 and later processors. It is an operating mode of x86 chips that replicates the memory management used by 8086 or 8088 chips, although they run much faster. In Real Mode, the running program has full access to the computer's memory and peripherals. In real mode, all of the CPU's protection features are disabled, paging is not supported, and program addresses correspond to physical memory addresses. The address space is limited to 1 MB of physical memory and uses a memory segmentation scheme. Other modes which exist are protected mode and virtual mode. The DOS operating system was not designed to take advantage of protected mode, so it always executes programs in real mode unless a protected mode extender is run first. Real mode limits the processor to 1 MB of memory and provides no memory management or memory protection features. The phrase is often used to describe device drivers that operate in this mode. MS-DOS runs in real mode.

The present invention may be used with a SCSI Device Management System (SDMS) BIOS. This is an SCSI option ROM used for PCI-SCSI devices. It contains a flash utility to update SDMS BIOS onboard host adapters. An adapter is a device such as a circuit that performs a specific function, such as a parallel port.

Big Real Mode (also called 32 bit Real Mode, UnReal Mode and Flat Real Mode) is used to provide access to memory within a 4 Gb linear address space. The X86 processor runs in two distinct modes as described in the Intel processor data sheets. The processor starts in Real Mode with an addressing limit of 1 MB (actually 1 MB 64 K−1 paragraph=16 bytes), and may be switched to Protected Mode, with a multi-terabyte access range using page tables.

Big Real Mode is commonly found in applications that run under real mode operating systems like MS-DOS, PC-DOS, and DR-DOS. DR-DOS provides a full multitasking environment on Pentium, 486, or 386-based hardware, has memory management extensions provided in the operating system, and has programs that can have direct access to create separate threads via the extended Application Programming Interface. Big Real Mode is attained by manipulating the processor into Protected Mode, setting up control registers, and exiting to Real Mode without resetting the special registers.

It is not required that Big Real Mode be the method used to access memory above 1 MB and below 4 GB. Other programming methods, protected mode for example, and methods using hardware could be used to accomplish the same objective. (Big Real Mode is preferred due to simplicity and the fact that hardware may not be available.)

A FLASH ROM is a large capacity, reprogrammable storage device that can store the POST and BIOS routines required for the initialization and operation of the computer system. The FLASH ROM is a non-volatile semiconductor integrated circuit which is derived from EPROM and EEPROM technologies. The architecture of flash chips is based on the idea that it will be seldom written to but will be read often. Because the FLASH ROM may be reprogrammed without being removed from the system, the FLASH ROM provides a greater convenience in making required software updates as compared to conventional ROMs.

Often, the FLASH ROM has spare storage capacity to accept codes intended for the microcontroller. The FLASH ROM has been shared between the microprocessor and a microcontroller. In such systems, the microprocessor possesses control of the FLASH ROM during the power-on reset and boot-up. After the microprocessor has determined the system is properly up and running, the microprocessor copies the BIOS code stored in the FLASH ROM to its main memory array to enhance the performance of the computer system because memory access speed is much quicker for the main memory array than it is for the FLASH ROM.

Various system BIOSs treat PCI configuration registers differently. Some may leave the FLASH ROM address alone, others may zero it out, and still others could leave it accessible. System firmware may be used to read or write to the PCI configuration registers during the startup process. The PCI configuration registers are generally a mixture of read-only registers and read/write registers. Read-only registers may include registers specifically dedicated to one of device id, vendor ID, status, class code, revision ID, header type, subsystem ID, subsystem vendor ID, interrupt pin, and other data. Read/write registers may include registers specifically dedicated to one of command, latency time, cache line size, base address registers, expansion ROM base address, interrupt line, and other data.

Various System BIOS's have code that enables and makes use of Big Real Mode for internal operations as permitted by certain Post Memory Manager (PMM) specifications. When the System BIOS enables Big Real Mode, the process code of the present invention detects this occurrence and prevents Big Real Mode from being disabled when the option ROM has finished using it, leaving it to the System BIOS to disable it.

Because the method may enable memory that conflicts with other existing memory, a test should be made to detect that possibility. Validation is a process used to verify the integrity or some other aspect of the transmitted information. Validation might include finding signatures, checksumming the contents of the memory to a known value, or any method that 'proves' the memory is usable. If conflicting memory is found, the code continues to loop (up to some practical limit) looking for memory that will validate. When found, the sequence continues. If not found, the sequence aborts. (An abort could be limiting or disabling depending on the implementation.) Validation may be desirable in some applications.

The undocumented series of X86 processor instructions are those instructions which actually exist but have not been written about or acknowledged in data manuals by their source company. However, they have been discovered and written about by published reference books. For example, reference books detail them as "Undocumented Instructions".

In FIG. 1, the method for accessing ROM PCI memory above 64 K starts involves the initial step 10 in which the system BIOS puts the load image in FLASH option ROM memory. The system BIOS only needs to find the beginning of the loader program. The access code in the loader finds the remainder of the loader program.

In step 20, the system BIOS runs the FLASH option ROM initialization code. Upon receipt of a subroutine call from an operating system or application programs, the system BIOS performs the actual hardware control. The BIOS includes a boot strap routine that is performed when the system is powered on and a routine for handling interrupt requests generated by the host adapter. The BIOS coordinates the initializing of the FLASH option ROM memory.

In step 30, initialization begins. The code enables 32 bit real mode memory addressing, up to 4 gigabytes. BIOS looks for a peripheral component interconnect (PCI) bus and, if it finds one, checks all the PCI cards.

In step 40, PCI function calls are made. Step 40 contains undocumented instruction sequences to verify/validate the memory spaces that are exposed by the calls. PCI function calls are made to enable the non-volatile memory at addresses which may or may not conflict with preexisting memory regions. Interspersed in step 40 are 'Big Real Mode' sequences that verify/validate those memory regions and determined their non-conflicting status. (Physically, the memory exists, but until the PCI calls are made, the memory region will usually be unmapped and therefore inaccessible.) These function calls enable the configuration space for the adapter (e.g., the host computer) that initialized the process. The PCI configuration space is direct mapped into the adapter's address space. This allows the host system to access the PCI configuration registers. Each function in a PCI device has 256 bytes of block addressed configuration space.

PCI interrupt 1 Ah supports a number of functions that access configuration registers. A System BIOS is required to support these calls for PCI adapters. Some of the relevant functions include

| PCI_FIND_PCI_DEVICE | EQU (02h) |
|---|---|
| PCI_READ_CONFIG_BYTE | EQU (08h) |
| PCI_READ_CONFIG_WORD | EQU (09h) |
| PCI_READ_CONFIG_DWORD | EQU (0Ah) |
| PCI_WRITE_CONFIG_BYTE | EQU (0Bh) |
| PCI_WRITE_CONFIG_WORD | EQU (0Ch) |
| PCI_WRITE_CONFIG_DWORD | EQU (0Dh). |

In step 50, the overflow image of the FLASH option ROM is accessed and validated. Validation may be performed through checksum calculations.

In step 60, the code and/or data are copied from the overflow area into main memory.

In step 70, PCI function calls disable/return configuration space to a previous state. Function calls of the PCI specification are used to read from and write to adapter configuration registers. These calls enable/re-enable/disable adapter memory at locations in Big Real Mode memory.

In step 80, the initialization process continues using additional code and data from main memory below 1 megabyte.

FIG. 2 illustrates sections of the FLASH memory. This memory may be located on the host adapter. Loading starts in low address memory. All of the initialization code and data dedicated to the option ROM is contained in the one FLASH memory in this embodiment. Contiguous memory locations are used. Various operations occur in low address memory such as search and allocation. Memory size exceeds the 64 K traditionally found in the option ROM and may be as large as 4 Gb. The overflow code and data are stored in the overflow area of the FLASH memory and are not part of the load image. They are only accessible using Big Real Mode memory instructions after being specifically enabled using PCI configuration space reads and writes. The load image, its signature, length, and zero checksum are stored in the FLASH memory. The access code is the new code that allows access to otherwise unavailable PCI configuration memory.

In the particular example of FIG. 2, "55AA" represents the beginning of the option ROM, starting on the boundary of byte 512 and "nn" represents the number of 512 byte blocks there are in the option ROM to fix the load size (such as 64 K). A checksum is generated from the bytes in the nn

* 512 area. That checksum, the sum of the digits in hexadecimal disregarding overflow, must by 0. If the checksum is correct, then the System BIOS treats the memory as an option ROM. Other configurations of the memory space may be achieved depending upon the application.

Alternate ways of practicing the invention may be employed which use the same access techniques, but perform other configuration space accesses that could modify other adapter memory to create a more unique execution environment, i.e., permanently change boot code before using it or modifying parameters to affect run-time behavior on a per boot basis.

Instead of using FLASH technology, the expanded memory portion may be implemented by battery backed RAM, EEPROM, EPROM, or even core or bubble memory. The expanded memory only needs to be effectively non-volatile.

FIG. 3 shows a functional block diagram of an embodiment of a computer system 100 having an adapter 102 coupled to an option ROM and a separate FLASH memory. In that case, the option ROM would contain the loader code with the separate FLASH memory containing the portion of memory that is changeable or upgradeable.

As separate units or devices, the FLASH memory may be a second option ROM or another memory device. Contiguous addressing may be employed depending upon the application. In various situations, it may be desirable or necessary to use other than contiguous addressing. If separate memories are used, they may be controlled through different configuration registers.

Figure 4:
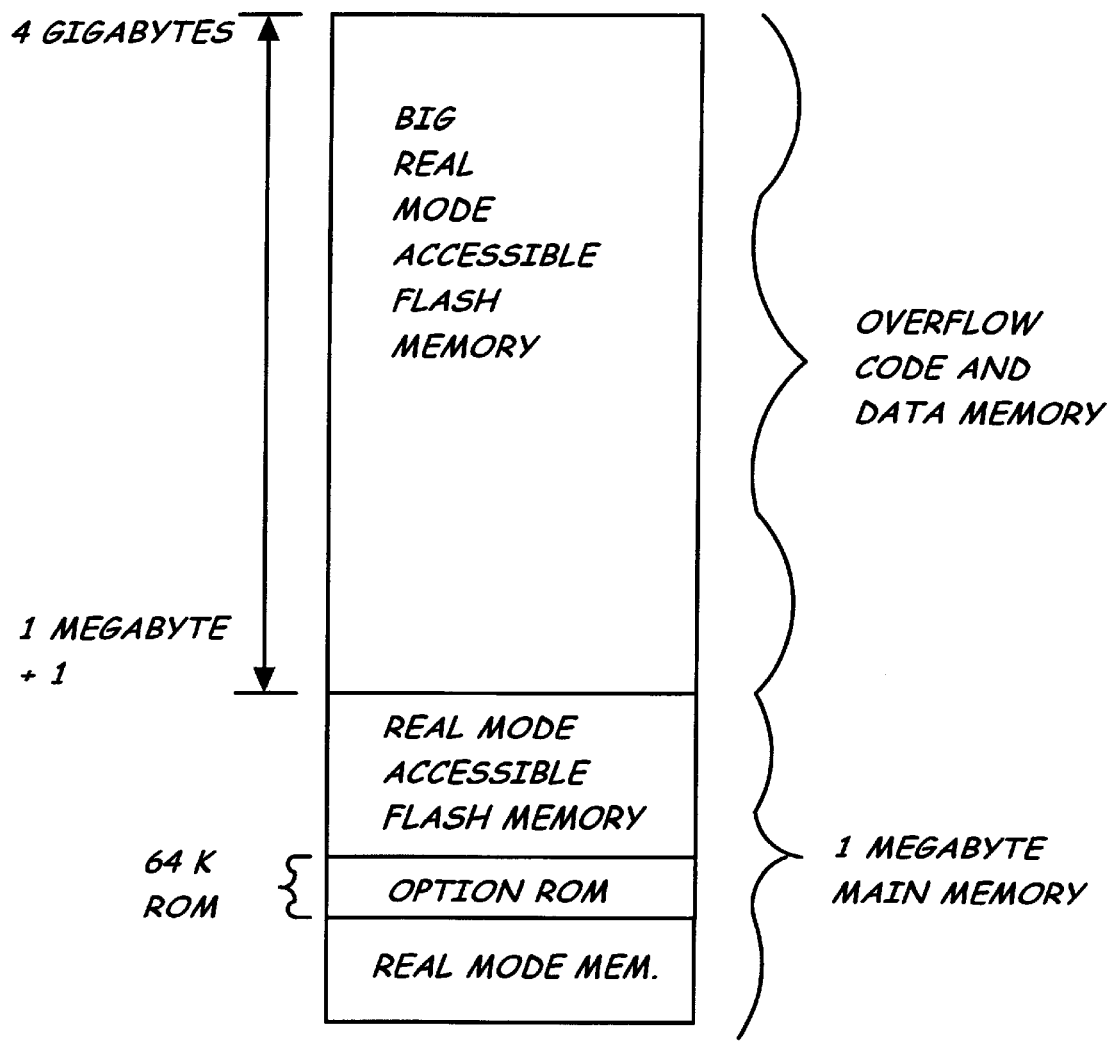
FIG. 4 illustrates a diagram of memory as used in the present invention.

FIG. 4 illustrates an exemplary diagram of memory allocation by the present invention. In FLASH or similar memory, the lower addresses (e.g., 64 K) correspond to an option ROM. Main memory includes memory addresses up to 1 megabyte. This corresponds to access by Real Mode. Overflow code and data image memory (or, overflow memory) is memory having address above 1 megabyte to 4 gigabytes. The overflow memory and PCI adapter FLASH memory are addressed using Big Real Mode memory accesses. The PCI adapter memory space is enabled using Peripheral Component Interface (PCI) bus function calls, such as PCI_FIND_PCI_DEVICE, PCI_READ_CONFIG_WORD and PCI_WRITE_CONFIG_DWORD.

The present invention is not limited to a certain family of processors and may be practiced with a variety of control devices. The expanded memory 120 is addressable by 32 bits, yielding a capacity of 4 GB. The addressing capability, due to Big Real Mode limitations, is not limited to 4 GB or 32 bits. Other sizes are possible depending upon the application. Since the expanded memory 120 uses FLASH technology, it is not expected to be written to with high frequency. The adapter 102 may be a microprocessor such as an X86 processor. The option ROM and FLASH memory are shown as separate units; however, they may be physically or logically integrated into one unit or device. If the option ROM and FLASH memory were separate units or devices, they would not need to have contiguous addressing.

The present invention overcomes deficiencies encountered by option ROMs such as RAID recognition and the inability to use the Simple Boot Support feature. These features require access to memory that is not normally accessible to an option ROM BIOS.

In RAID recognition, Redundant Array of Independent Disk Drives (RAID) control may be implemented in many ways. A dedicated processor closely coupled to the adapter may be provided to control the drives. Software may be used to take over the control of an existing adapter. If another process takes over the adapter, contention with the process of the present invention needs to be resolved. This may be done by having the other process write into the memory space of the adapter. Big Real Mode provides access to that memory space used by the other process. The process of the present invention uses access code which makes use of the X86 chip's ability to get into Big Real Mode and "peek/poke" memory that would otherwise be inaccessible without the control of the adapter configuration registers with PCI function calls.

Like RAID recognition, Simple Boot Support requires the process code of the present invention to 'peek/poke' memory outside the normal Real Mode 1 MB limit. Peak/poke memory is read/write memory which are accessed outside normal operations. For example, video calls are function calls to display elements of an image are normal ways that programs put new information on a display screen. However, it may be more efficient and faster if, instead of function calls, data is directly written into video memory; the process which does this is peeking and poking memory.

Simple Boot (also called Quick Boot) is part of a Microsoft initiative that aims to make the PC seem to be more like any other appliance. Instead of locating all drives, only the boot drive is located, initialized, and accessed. This, combined with other optimizations, speeds up the boot process. The process code of the present invention probes Big Real Mode memory to find out the state of the "Simple Boot Flag" which determines whether all the drives are to be located or if only the boot drive is to be located.

The intermediate device that controls access to the memory is a configurable register located on the adapter that is associated with the memory. Writing the configuration register with a 32 bit address (limited by unchangeable low order bits in the register) locates that memory at the address specified. A 32 bit value may be written in the register that will locate the memory at an address space which already exists. Several registers on the chip with the same address may be written so that various memory regions on the adapter conflict with one another. If, for example, for a 128 K FLASH memory, a register could be written with 1111 1111 1111 1110 0000 0000 0000 0000 0000b. This would enable the FLASH memory at an address range of FFFE0000h to FFFFFFFF. An adapter may also accept bits in the low order positions.

The method and apparatus of the present invention may be applied to expand the memory capability of an option ROM or to memory expansion in general.

It is believed that the method and apparatus for accessing ROM PCI memory above 64 K of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for accessing, via the commands of an adapter, from a first read/limited write memory having a first size, and a second read/limited write memory having a second size greater in size than the first size, comprising:

preparing a load image for transfer to the first read/limited write memory;

making a determination of the size of the load image;

initializing the first read/limited write memory to enable addressing of a memory area that includes the first read/limited write memory and the second read/limited write memory; and making Big Real Mode bus function calls via process code that prevents system BIOS from disabling Big Real Mode to enable a configuration space in the second read/limited write memory for the adapter.

2. The method of claim 1, further comprising, if the size of the load image is determined to exceed the first size, then generating an overflow image which represents the difference in size between the size of the load image and the first size and generating a first read/ limited write memory image of a size no greater than the first size.

3. The method of claim 2, further comprising transferring the overflow image to the second read/limited write memory and transferring the first read/limited write memory image to the first read/ limited write memory.

4. The method of claim 3, further comprising accessing and validating the overflow image.

5. The method of claim 4, further comprising transferring the overflow image from the second read/limited write memory to the first read/limited write memory.

6. The method of claim 5, further comprising, prior to making a determination of the size of the load image, running the first read/limited write memory initialization code.

7. The method of claim 6, further comprising, after transferring the overflow image from the second read/ limited write memory to the first read/limited write memory, making function calls to disable or return the configuration space to a previous state.

8. The method of claim 7, further comprising, after making function calls to disable or return the configuration space to a previous state, continuing the initialization process by using data and instructions of the overflow image.

9. The method of claim 1, the function calls being Peripheral Component Interface (PCI) function calls.

10. The method of claim 1, the first and second read/ limited write memories being non-volatile.

11. The method of claim 10, the first read/limited write memory including an option ROM.

12. The method of claim 1, the first and second read/ limited write memories being FLASH memory.

13. A computer system, comprising:

an adapter which provides control signals and data to other devices;

a first read/limited write memory having a first size and being coupled to the adapter to effect data transfers; and a second read/limited write memory having a second size that is greater than the first size, the second read/limited write memory being used to store an overflow image in a data transfer to the first read/limited write memory when the load image to be transferred to the first read/limited write memory has a size which exceeds the first size, wherein the computer system utilizes Big Real Mode bus function calls via process code that prevents system BIOS from disabling Big Real Mode to enable a configuration space in the second read/limited write memory for the adapter.

14. The computer system of claim 13, the adapter being an X86 processor.

15. The computer system of claim 13, the first read/ limited write memory being an option ROM.

16. The computer system of claim 15, the option ROM using FLASH technology.

17. The computer system of claim 16, the option ROM having a size of 64 K.

18. The computer system of claim 13, the second read/ limited write memory being implemented in FLASH.

19. The computer system of claim 18, the second read/ limited write memory being addressable by 32 address bits.

20. A computer system which presumes a first size for a FLASH option ROM, comprising:

an adapter having system BIOS; and a non-volatile memory having a second size, the second size being greater than the first size, the non-volatile memory not being accessible through Real Mode, the system BIOS initiating loading into the non-volatile memory, Peripheral Component Interface (PCI) configuration space function calls being made via process code that prevents the system BIOS from disabling Big Real Mode to enable configuration space in the non-volatile memory for storage of an overflow image for the adapter by using Big Real Mode.

21. The computer system of claim 20, wherein the overflow image is accessed from the adapter and validated by the adapter.

22. The computer system of claim 21, the overflow image is copied from the non-volatile memory to the FLASH option ROM.

23. A method for accessing an overflow portion of an expanded option ROM, comprising:

using a system BIOS to enter Big Real Mode, wherein Big Real Mode allows access to the overflow portion but Real Mode does not allow access to the overflow portion;

making Peripheral Component Interface (PCI) bus function calls to enable configuration space in the overflow portion of the expanded option ROM for an adapter on which the system BIOS resides;

copying data from the overflow portion to a non-overflow portion of the expanded option ROM; and accessing and validating an overflow image for the expanded option ROM, wherein process code apart from the system BIOS enables Big Real Mode and does not permit system BIOS to disable Big Real Mode.

24. A method for switching operational modes for transferring data to and from a non-volatile memory, comprising:

placing a system BIOS in a first operational mode; and initiating process code, separate from the system BIOS and responsive to processing by the system BIOS, the process code including bus function calls that ensure the system BIOS enters a second operational mode and prevents the system BIOS from leaving the second operational mode, the process code being located in an address space supported by the first operational mode, the second operational mode supporting a larger address space than the first operational mode.

25. The method of claim 24, wherein the step of initiating process code involves invoking function calls.

26. The method of claim 25, wherein the function calls are Peripheral Component Interface (PCI) function calls which enable configuration space for an adapter on which resides the system BIOS.

27. The method of claim 24, wherein the first operational mode is Real Mode.

28. The method of claim 27, wherein the second operational mode is Big Real Mode.

29. The method of claim 23, wherein Peripheral Component Interface (PCI) functions used to maintain an overflow code and data memory through the Big Real Mode include read and write functions for bytes and words.

30. The method of claim 1, wherein the bus function calls include Peripheral Component Interface (PCI) configuration space reads and writes, the method being used to control a Redundant Array of Independent Disks (RAID).

31. The computer system of claim 13, wherein the second read/limited write memory is a battery backed random access memory (RAM).

32. The computer system of claim 13, wherein the first read/limited write memory is 1 megabyte in size.

* * * * *